(12) United States Patent
Hsiao

(10) Patent No.: US 7,345,869 B2
(45) Date of Patent: Mar. 18, 2008

(54) SUPPORTING FRAME STRUCTURE

(75) Inventor: Yi-Liang Hsiao, Taoyuan (TW)

(73) Assignee: Micro-Star Int'l Co., Ltd., Taipei (TW)

( * ) Notice: Subject to any disclaimer, the term of this patent is extended or adjusted under 35 U.S.C. 154(b) by 0 days.

(21) Appl. No.: 11/488,788

(22) Filed: Jul. 19, 2006

(65) Prior Publication Data

US 2007/0019379 A1  Jan. 25, 2007

(30) Foreign Application Priority Data

Jul. 20, 2005 (TW) ............... 94124593 A

(51) Int. Cl.
*H05K 7/00* (2006.01)
(52) U.S. Cl. ............ 361/679; 361/727; 312/223.2
(58) Field of Classification Search ........ 361/679, 361/727; 312/223.2
See application file for complete search history.

(56) References Cited

U.S. PATENT DOCUMENTS

| | | | |
|---|---|---|---|
| 6,351,379 B1 * | 2/2002 | Cheng | 361/685 |
| 6,442,030 B1 * | 8/2002 | Mammoser et al. | 361/727 |
| 6,798,650 B2 | 9/2004 | Reznikov et al. | |
| 6,807,054 B1 * | 10/2004 | Waller et al. | 361/683 |
| 6,836,406 B2 | 12/2004 | Weng et al. | |
| 6,876,547 B2 | 4/2005 | McAlister | |
| 6,891,723 B1 | 5/2005 | Lin et al. | |
| 6,986,675 B2 * | 1/2006 | Takada | 439/159 |

* cited by examiner

*Primary Examiner*—Jayprakash Gandhi
*Assistant Examiner*—Ingrid Wright
(74) *Attorney, Agent, or Firm*—Rabin & Berdo, P.C.

(57) ABSTRACT

A supporting frame structure movably joined in a case is used to mount a loaded object, such that the object can be disposed in the case or moved outside the case. In the present invention, a motion mechanism is disposed between the case and the supporting frame, by which the supporting frame has a handling position outside the case and a fixed position inside the case. At the fixed position, the motion mechanism forms an interference relation, such that the supporting frame is fixed on the mounting position and is unable to be departed from the case.

9 Claims, 13 Drawing Sheets

SUPPORTING FRAME STRUCTURE

CROSS-REFERENCE TO RELATED APPLICATIONS

This non-provisional application claims priority under 35 U.S.C. § 119(a) on Patent Application No(s). 094124593 filed in Taiwan, R.O.C. on Jul. 20, 2005 the entire contents of which are hereby incorporated by reference.

BACKGROUND OF THE INVENTION

1. Field of Invention

The present invention relates to a supporting frame structure used in a computer case, and more particularly, to a movable supporting frame structure mounted in a computer case for mounting computer peripheral equipments.

2. Related Art

As requirements on data storage are increased and being out of the consideration for data security, servers or computer hosts at present all support the technique of hard disk hot plugging, i.e., the hard disk can be directly drawn out or replaced when the server or computer host is still in operation. To facilitate the hard disk hot plugging for the user, the hard disk is mounted on a hard disk extracting box, and then the hard disk extracting box is inserted into the server or computer host or pulled out from the server or computer host.

At present, the relative designs of the hard disk extracting box can be seen in U.S. Pat. No. 6,798,650, No. 6,876,547, No. 6,836,406, No. 6,891,723 and so on. A hard disk extracting box is approximately a rectangular box. The top surface of the box is an opening for a hard disk to be disposed in. A plurality of through-holes is disposed in the side surfaces of the extracting box, and thereby fasteners such as screws can be used to lock the hard disk in the extracting box. Further, a connector is disposed at the back of the extracting box, wherein one end of the connector is used for hard disk plugging and the other end is exposed out of the extracting box. Moreover, a snap-in mechanism is disposed at the front end of the hard disk extracting box, at least one frame matching the hard disk extracting box is disposed in the server or computer host, and a connector is correspondingly disposed at the back of the frame. When the hard disk extracting box is to be mounted in the server or computer host, the hard disk extracting box is first aligned to the frame of the server or computer host, and then moved into the frame. When the connector of the hard disk extracting box presses against the connector in the server or computer host, the user must apply a certain force to make the connector of the hard disk extracting box inserted into the connector of the server or computer host, so as to achieve the electrical connection between the hard disk and the server or computer host. Finally, the snap-in mechanism is adopted to be jointly hooked at a position corresponding to the case of the server or computer host, thus fulfilling the assembly of the hard disk extracting box and fixing the hard disk extracting box in the case of the server or computer host. When the user intends to pull out the hard disk extracting box, the hooking relation of the snap-in mechanism must be removed first, and then the hard disk extracting box is moved out of the frame, so the hard disk extracting box can be replaced.

It can be seen from the conventional hard disk extracting box structure that:

First, the hard disk extracting box with a hard disk assembled thereon is pushed into the frame from the outside, and the hard disk extracting box and the frame must cooperate with each other to insert the hard disk extracting box into or draw it out from the frame freely. When inserting the hard disk extracting box, the user must apply a pushing force, and the resistance is increased as the hard disk extracting box rubs against the frame. When drawing out the hard disk extracting box directly, the user must overcome the snap-in force between the connector of the hard disk extracting box and the connector of the server or computer host. Or, the hard disk extracting box utilizes the snap-in mechanism to form a lever relation, so as to generate a moment to remove the snap-in relation between the connector thereof and the connector of the server or computer host. However, the mechanism of the hard disk extracting box thus becomes more complicated.

Second, when the hard disk extracting box is moved into the frame, the force for inserting the connector of the hard disk extracting box into the connector of the server or computer host is controlled by the user. However, as the force from the user is not equal, excessive or insufficient force may damage the connecters or cause poor electrical connection between the connectors.

SUMMARY OF THE INVENTION

Hard disk hot plugging in servers or computer hosts has been widely used. At present, the conventional hard disk extracting box is moved in or out with the force applied by the user. However, the conventional hard disk extracting box is not only complicated in structure, but also inconvenient in operation and is easily to be damaged as the force for moving or joining is controlled by the user. Therefore, the present invention provides a supporting frame structure for performing the moving actions via a motion mechanism.

According to the present invention, the supporting frame structure disposed in a case comprises a box and a motion mechanism. The box is used to mount a loaded object, and the motion mechanism comprises a first actuator, a second actuator, a third actuator and an active component. One end of the first actuator is pivotally connected to the back end of the box and the other end thereof is pivotally connected to the second actuator. The other end of the second actuator is further pivotally connected to the front end of the case. One end of the third actuator is pivotally connected to the second actuator and the other end thereof is pivotally connected to the active component. The active component is movably disposed on the box. When a force is applied to the active component, the force is transmitted from the active component to the third actuator, and then the third actuator pushes or pulls the second actuator, thus the second actuator further pushes or pulls the first actuator by taking the pivot of the case as a supporting point, such that the first actuator drives the box to move relative to the case, and thus the box obtains a handling position outside the case and a fixed position inside the case. Moreover, at the mounting position, the first actuator and the second actuator are arranged in a line, thus forming an interference relation. Therefore, the supporting frame is fixed at the fixed position and can only be moved to the handling position when a force is applied to the active component again.

According to the supporting frame structure disclosed by the present invention, the user can use the active component to move the supporting frame relative to the case via the design of motion mechanism. After the supporting frame is moved into the case, the interference relation formed by the motion mechanism fixes the supporting frame into the case without mounting other snap-in or fixing structures. Further, via the design on the displacement of the motion mechanism, if the loaded object on the supporting frame is a hard disk drive, when the supporting frame is moved to the fixed position, the connector of the hard disk drive on the supporting frame can be inserted into the connector at a corresponding position of the case, such that the force for plugging the connector at each time is equal, thereby ensuring the electrical connection and avoiding damages to the connectors due to the inappropriate force applied by the user.

The features and practice of the preferred embodiments of the present invention will be illustrated in detail below with the accompanying drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and which thus is not limitative of the present invention, and wherein.

DETAILED DESCRIPTION OF THE INVENTION

The supporting frame structure disclosed by the present invention is used in the case of an electronic device, wherein the electronic device is, for example, electronic data processing devices such as server and computer host. The supporting frame is used to mount a loaded object, wherein the object is, for example, computer peripheral equipments such as hard disk drive and optical disk drive. In the following detailed description of the present invention, the present invention applied to a server and hard disk drive is used as the preferred embodiments of the present invention. The supporting frame is movably disposed in the case of the server, such that the hard disk drive can perform hot plugging via the supporting frame.

Figure 1:
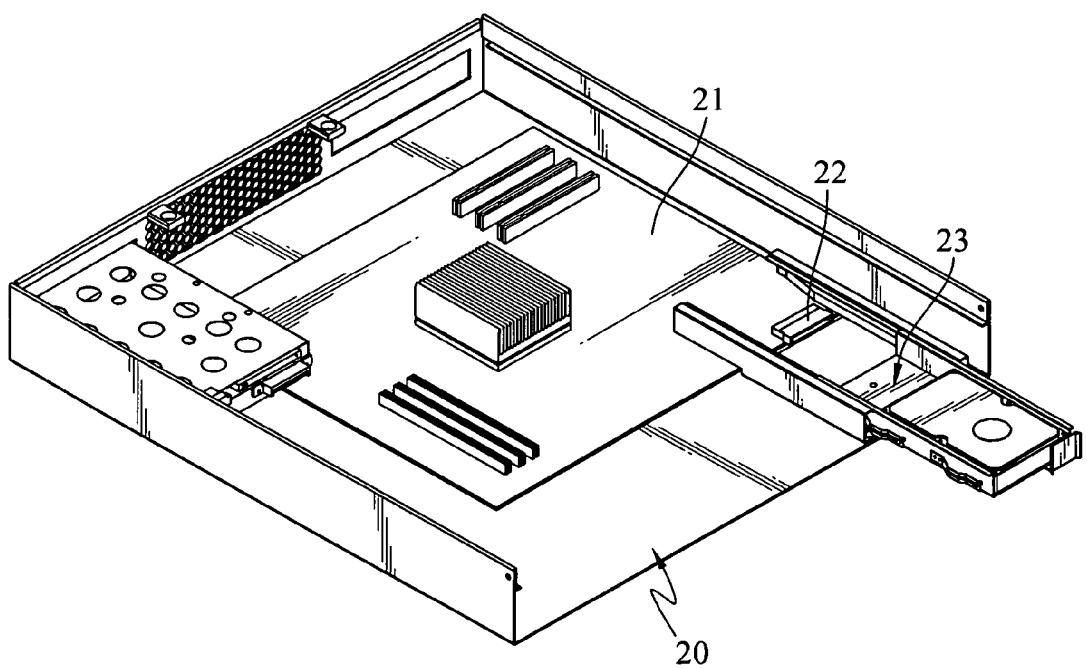
FIG. 1 is a schematic view of the application of the present invention.
Figure 2:
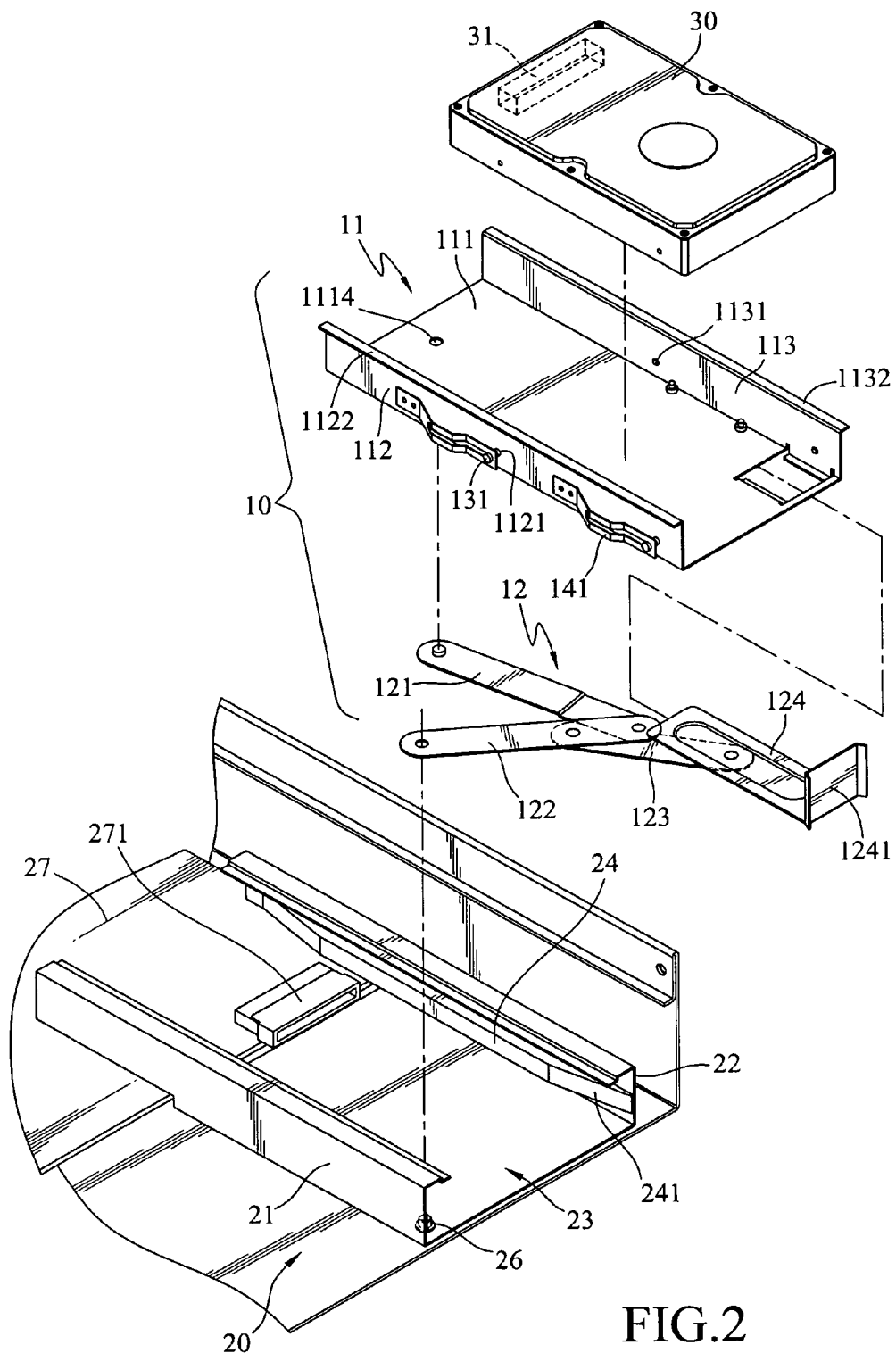
FIG. 2 is a schematic exploded view of the configuration of the present invention.

Referring to FIGS. 1 and 2, a supporting frame 10 of the present invention is disposed in a server case 20. The server case 20 at least has a main board 27, and a pair of slide rails 21, 22 is respectively erected on one side of the case 20. The slide rails 21, 22 are spaced by a distance to form an accommodation space 23. The main board 27 has a connector 271 disposed at the back of the accommodation space 23. The supporting frame 10 is movably disposed on the slide rails 21, 22 of the case 20. A pushing rib 24 is disposed on the inner side of the slide rails 21, 22 (the same for the slide rail 21). A guiding inclined surface 241 is disposed at the front end of the pushing rib 24 (the same for the slide rail 21). A loaded object 30 can be mounted on the supporting frame 10, and the two parts both move relative to the case 20. The loaded object 30 is a hard disk drive with at least one connector 31. When the supporting frame 10 is moved into the case 20, the connector 31 of the loaded object 30 is inserted into a connector 271 on the main board 27 to form electrical connection. Moreover, to enable the supporting frame 10 to move relative to the case 20, a supporting point 26 is disposed in the front end of the slide rail 21.

Figure 3:
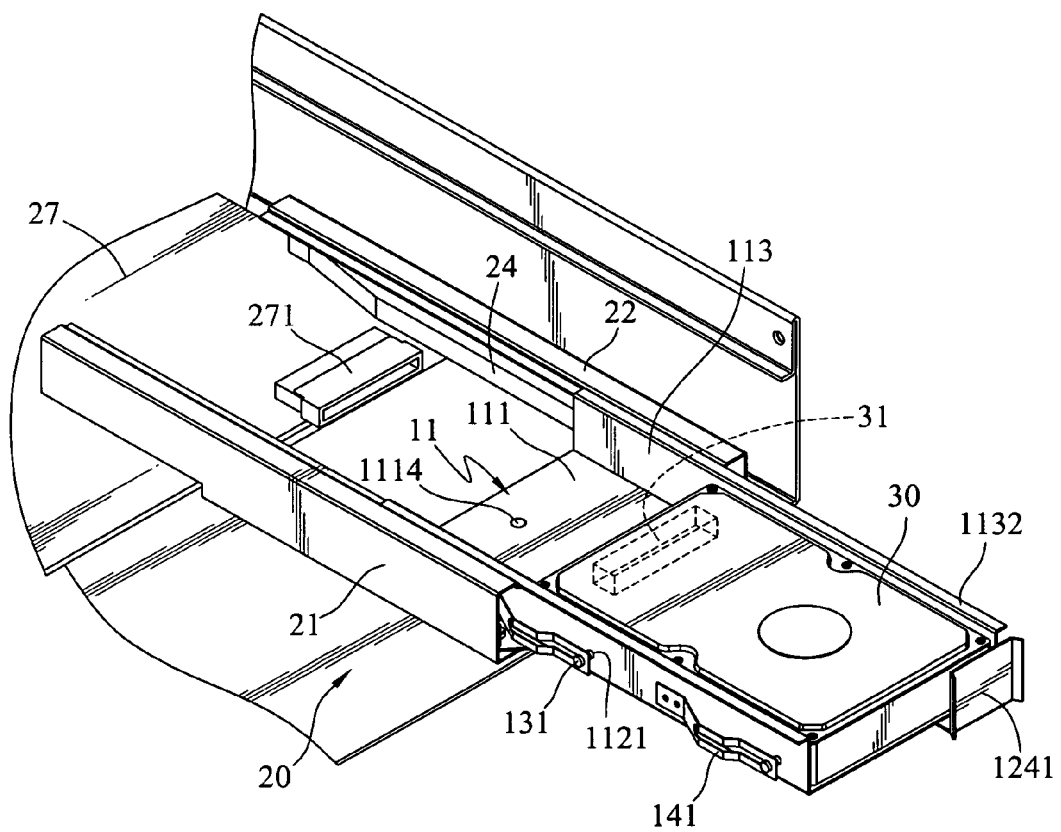
FIG. 3 is a schematic combined view of the configuration of the present invention.
Figure 4:
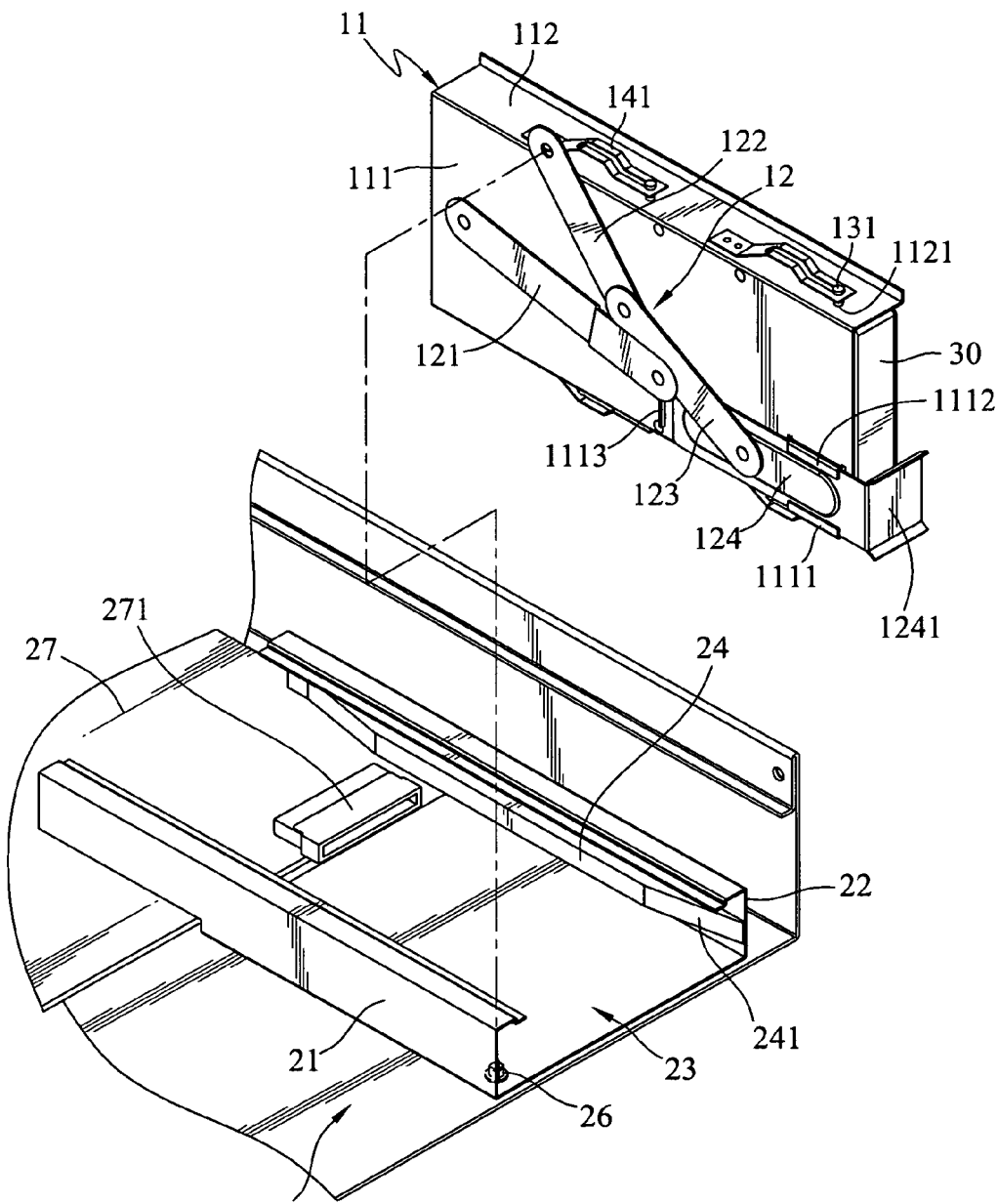
FIG. 4 is a schematic view of the configuration of the present invention from another viewing-angle.

As shown in FIGS. 2, 3 and 4, the supporting frame 10 of the present invention includes a box 11 and a motion mechanism 12, wherein the box 11 is approximately in the form of a character "U" with a bottom plate 111 and two side plates 112, 113. The distance between the side plates 112, 113 is a little larger than the breadth of a loaded object 30. Besides, a plurality of through-holes 1121, 1131 is disposed in the two side plates 112, 113. Fixing pins 131 of the same number as the through-holes 1121, 1131 are disposed on the external side of the side plates 112, 113 corresponding to the through-holes 1121 (the same for the side plate 113). The fixing pins 131 are suspended on the external sides of the side plates 112, 113 via a reed 141. Moreover, fins 1122, 1132 are extended outward at the top of the side plates 112, 113 and just disposed across the slide rails 21, 22, such that the box 11 can move along the slide rails 21, 22. When the box 11 moves along the slide rails 21, 22 into the case 20, the reed 141 moves along the guiding inclined surfaces 241, 251 till against the pushing ribs 24 on the inner sides of the slide rails 21, 22, such that the fixing pins 131 extend into the box 11 and are joined to the loaded object 30, thereby making the loaded object 30 fixed onto the box 11. Further, guide rails 1111, 1112 are disposed at the front of the bottom plate 111 near the side plate 113. A stopper 1113 is disposed correspondingly at the back of the guide rails 1111, 1112 on the bottom plate 111. Further, a pivot hole 1114 is disposed at the back of the bottom plate 111.

Figure 5:
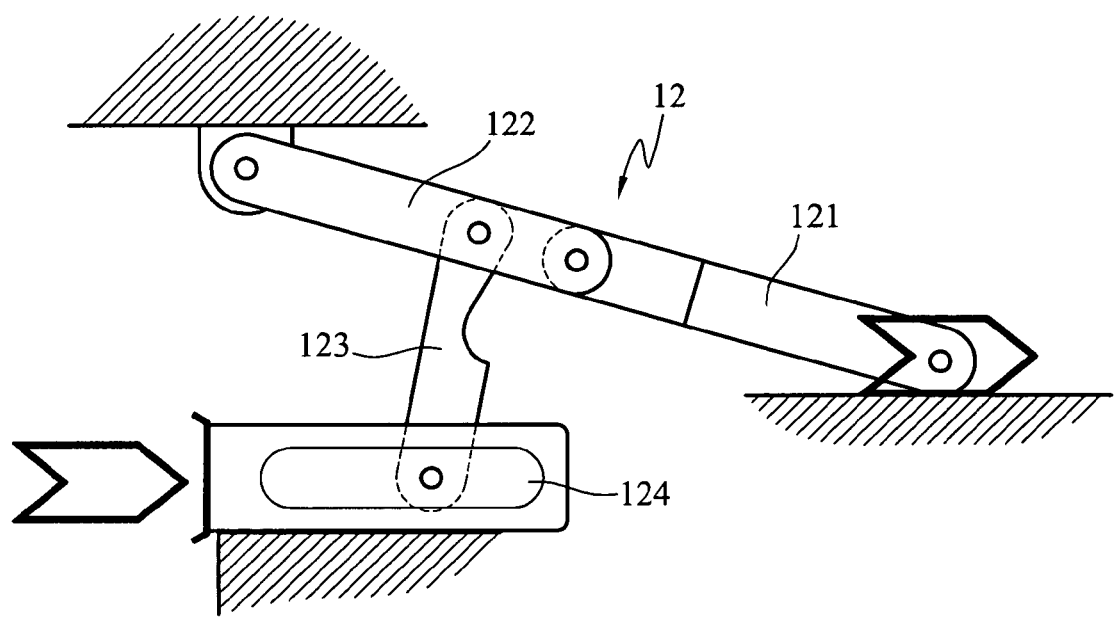
FIG. 5 is a schematic relation view of the motion mechanism according to the present invention.
Figure 6A:
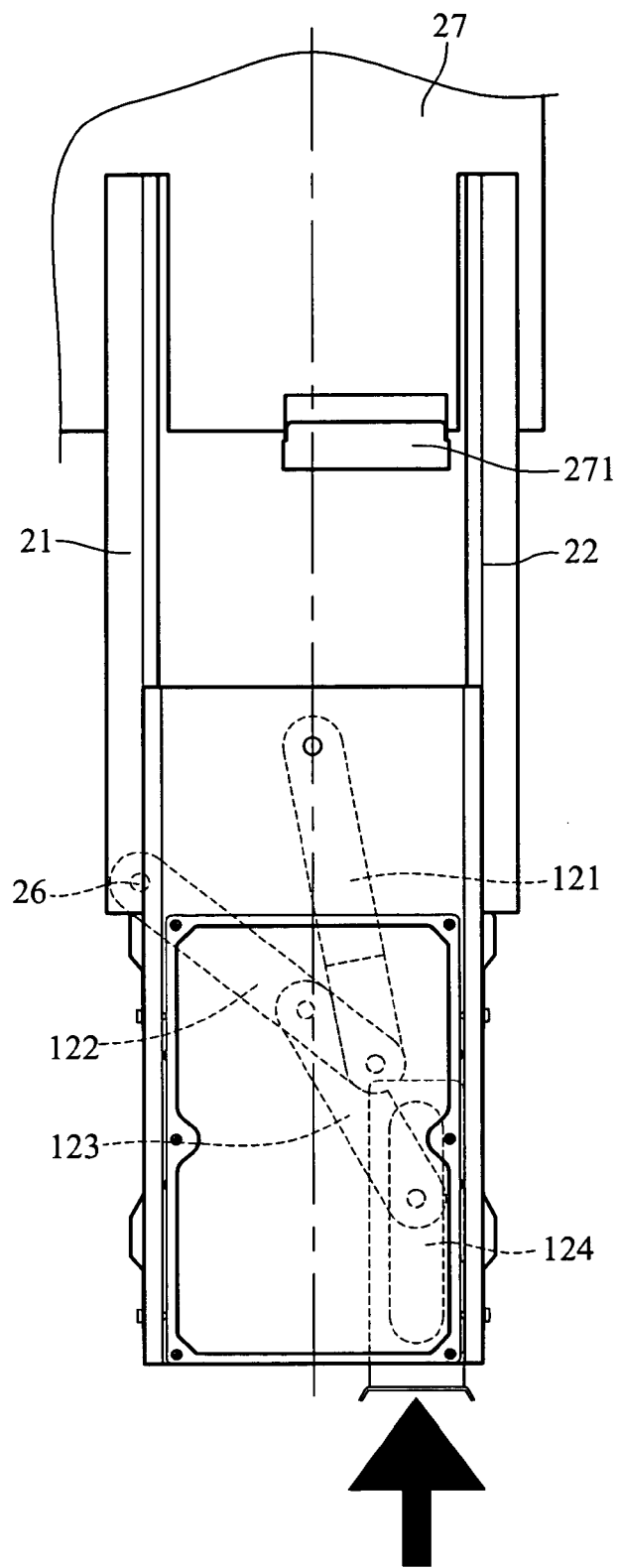
FIGS. 6A to 6F are schematic relation views of the motions of the present invention.
Figure 6B:
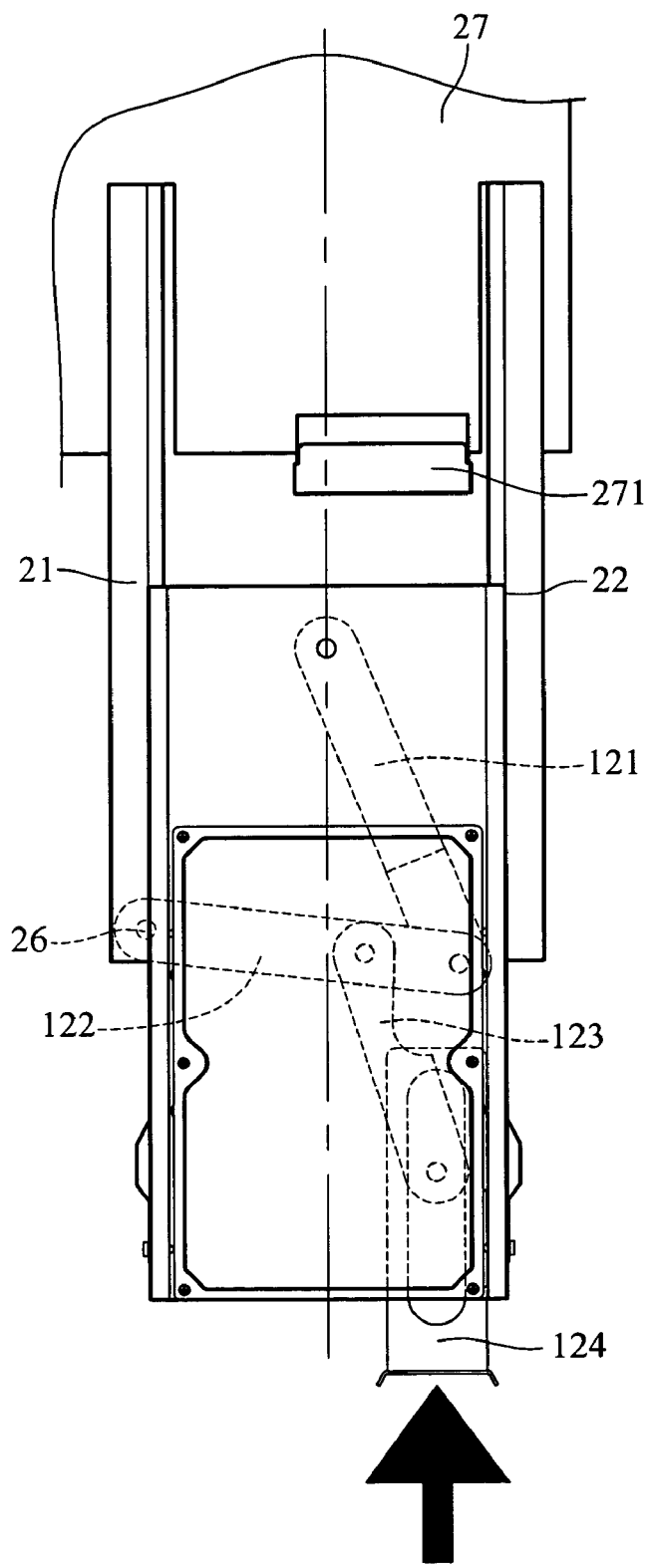
Figure 6C:
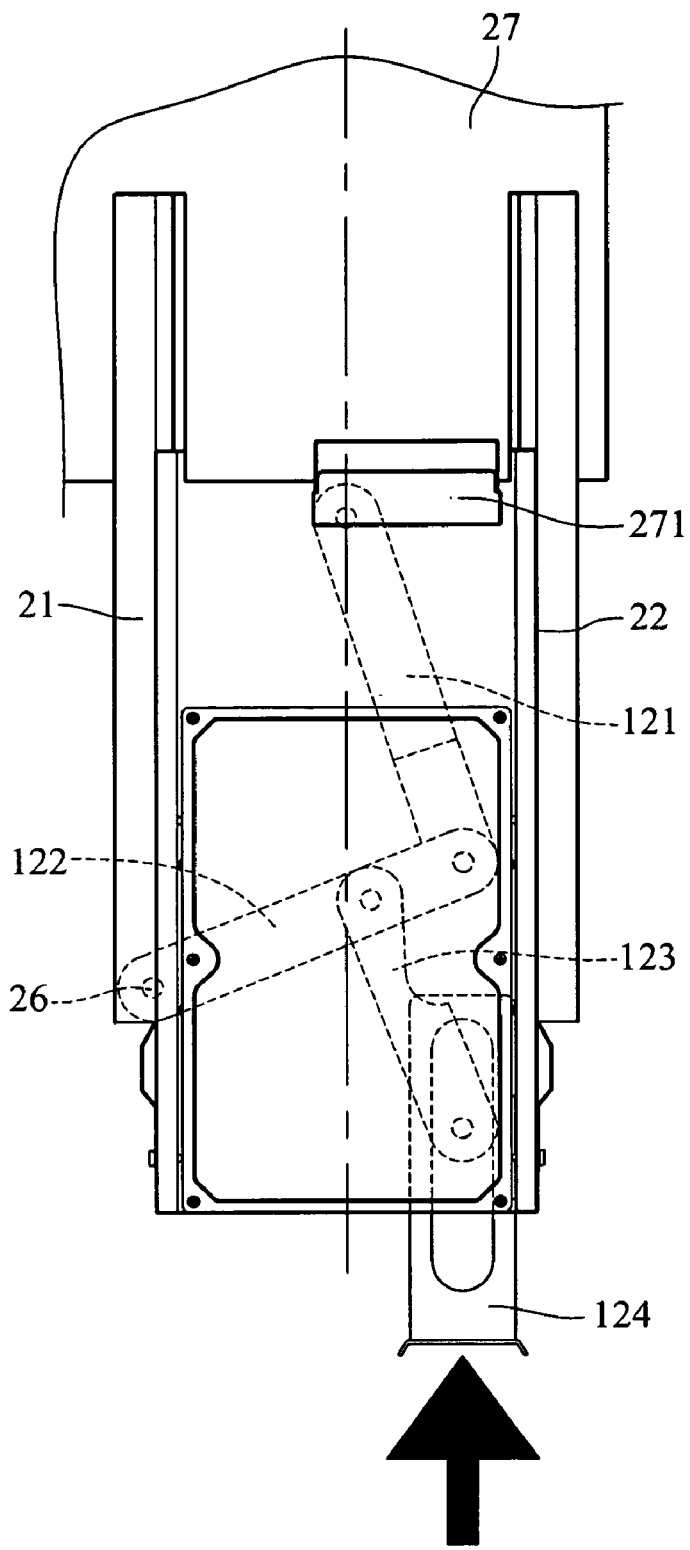
Figure 6D:
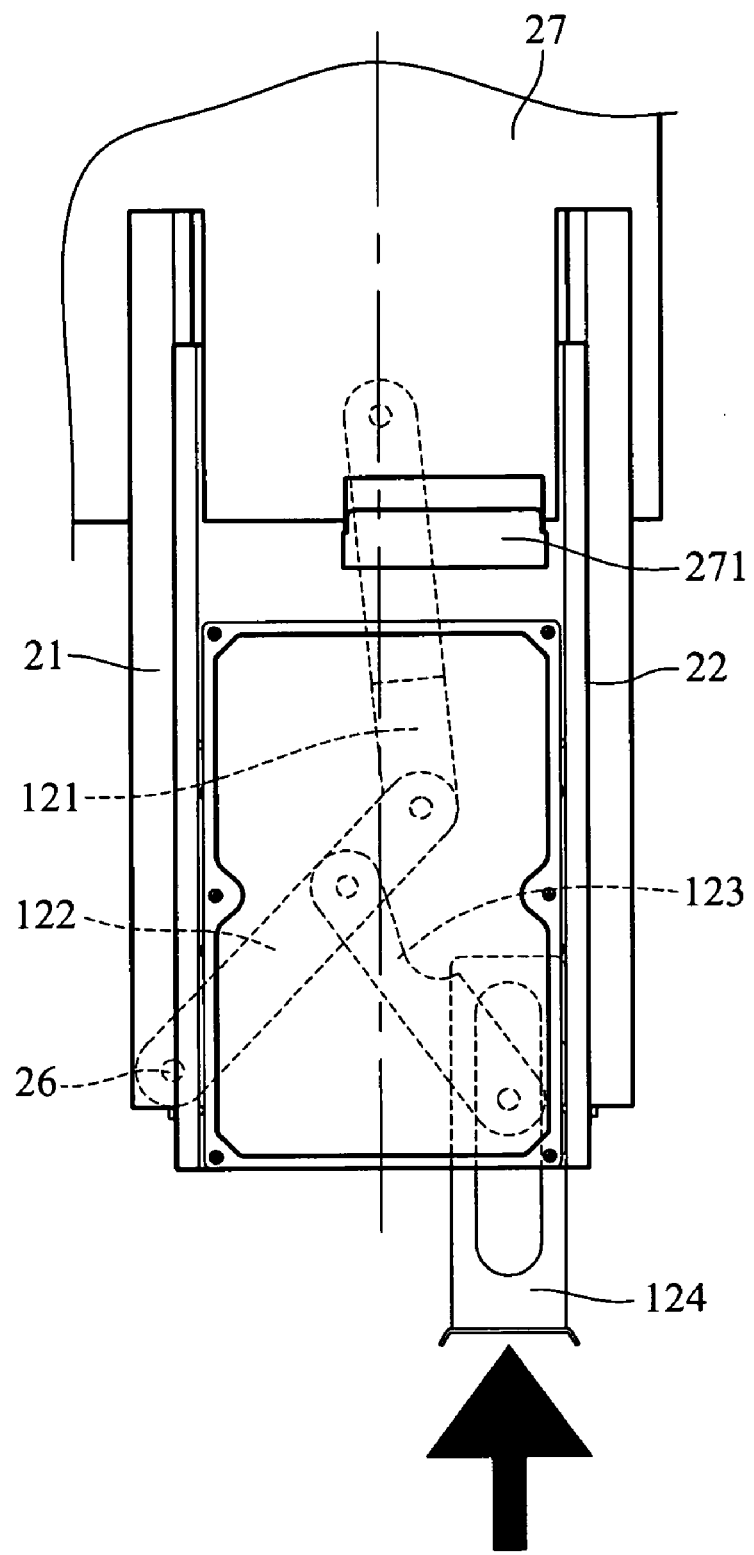
Figure 6E:
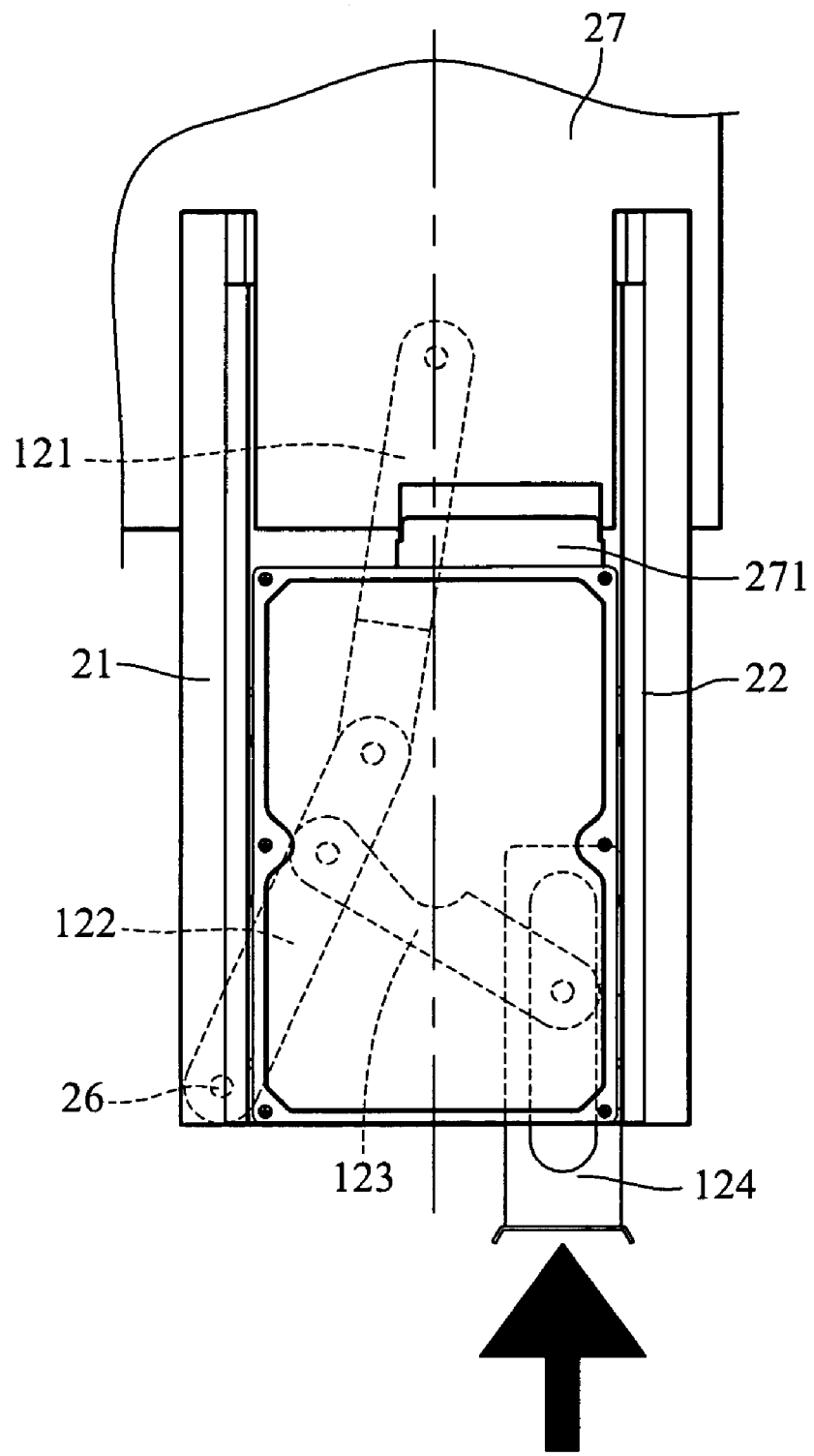
Figure 6F:
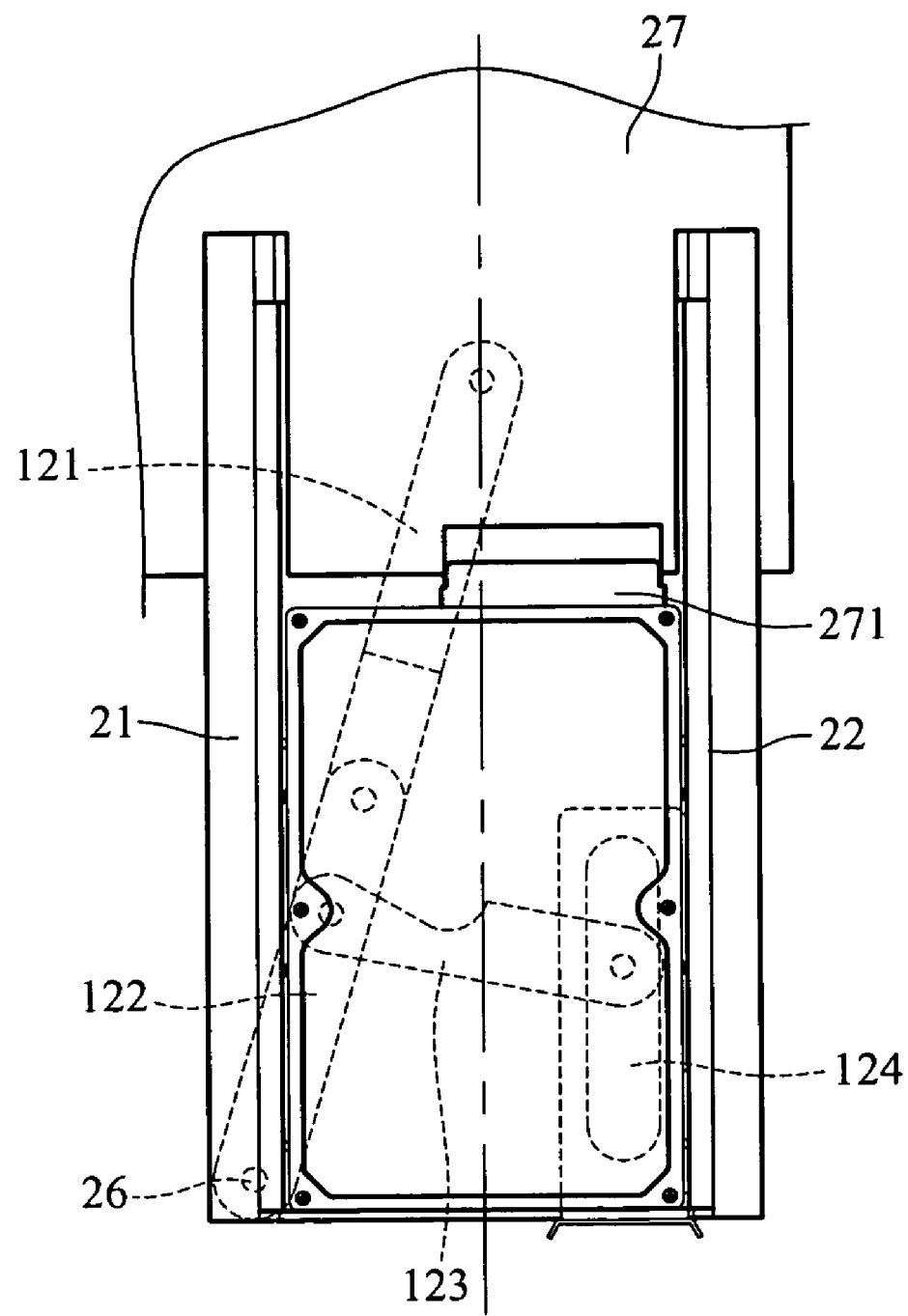

Referring to FIG. 5, the motion mechanism 12 includes a first actuator 121, a second actuator 122, a third actuator 123 and an active component 124, which are all strip plates. The active component 124 further has an operation plate 1241. One end of the first actuator 121 is pivotally connected to the pivot hole 1114 at the back of the bottom plate 111 of the box 11 and the other end of the first actuator 121 is pivotally connected to one end of the second actuator 122. The other end of the second actuator 122 is pivotally connected to the supporting point 26. One end of the third actuator 123 is pivotally connected to the second actuator 122 at a position near the pivot between the second actuator 122 and the first actuator 121. The other end of the third actuator 123 is pivotally connected to the active component 124. The active component 124 is movably disposed on the guide rails 1111, 1112 and moves toward the first actuator 121 till against the stopper 1113. As such, the motion mechanism 12 is achieved. The motion mechanism 12 using the operation plate 1241 of the active component 124 as the position for force application, so as to make the active component 124 move back and forth on the bottom surface of the box 11. The force is transmitted from the active component 124 to the third actuator 123, and the third actuator 123 pulls and pushes the second actuator 122 via the back-and-forth movement of the active component 124. The second actuator 122 is pulled and pushed by the third actuator 123 to rotate and sway back and forth about the supporting point 26.

Further, the second actuator 122 pulls and pushes the first actuator 121 when rotating and swaying. The other end of the first actuator 121 is pivotally connected to the pivot hole 1114 in the bottom plate 111 of the box 11, thus pulling or pushing the box 11 to move back and forth along the slide rails 21, 22.

Referring to FIGS. 6A to 6F, according to the supporting frame 10 of the present invention, the box 11 is movably disposed in the case 20 via the motion mechanism 12, such that the box 11 can be moved into or drawn out from the case 20. Limited by the slide rails 21, 22, the box 11 performs a linear movement in a direction which is defined as a moving direction Y.

Figure 7A:
FIGS. 7A to 7D are dynamic analysis views of the motion mechanism of the present invention.
Figure 7B:
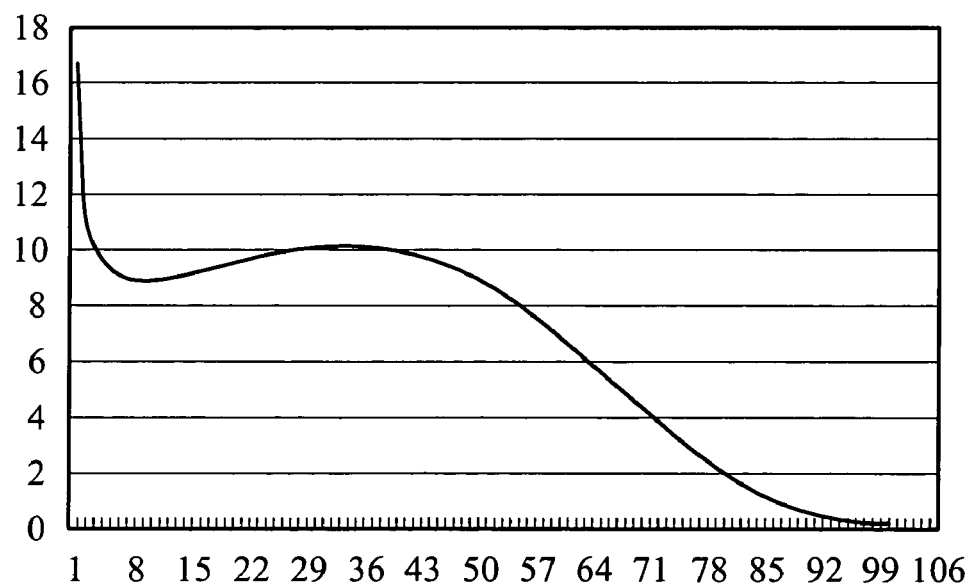
Figure 7C:
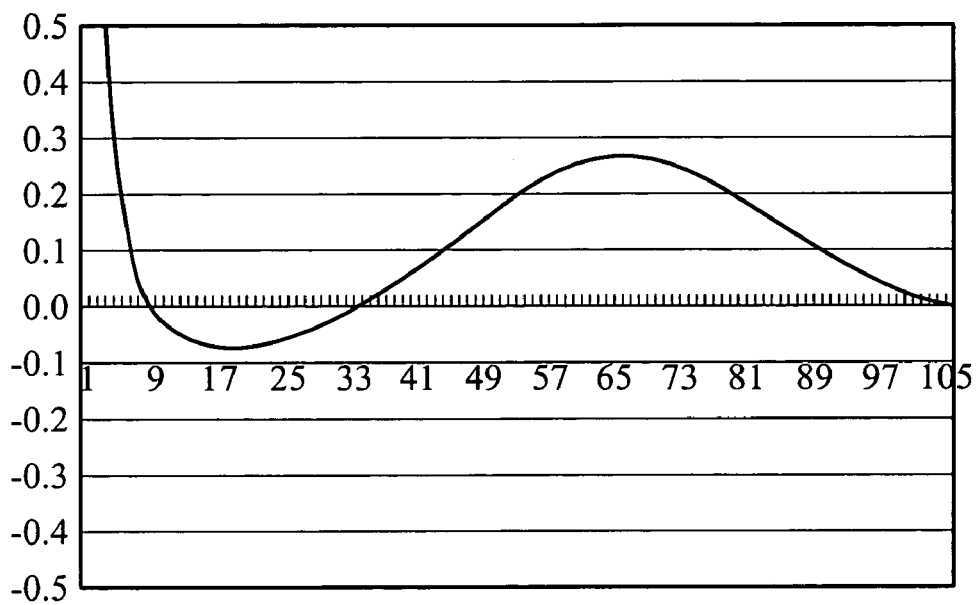
Figure 7D:
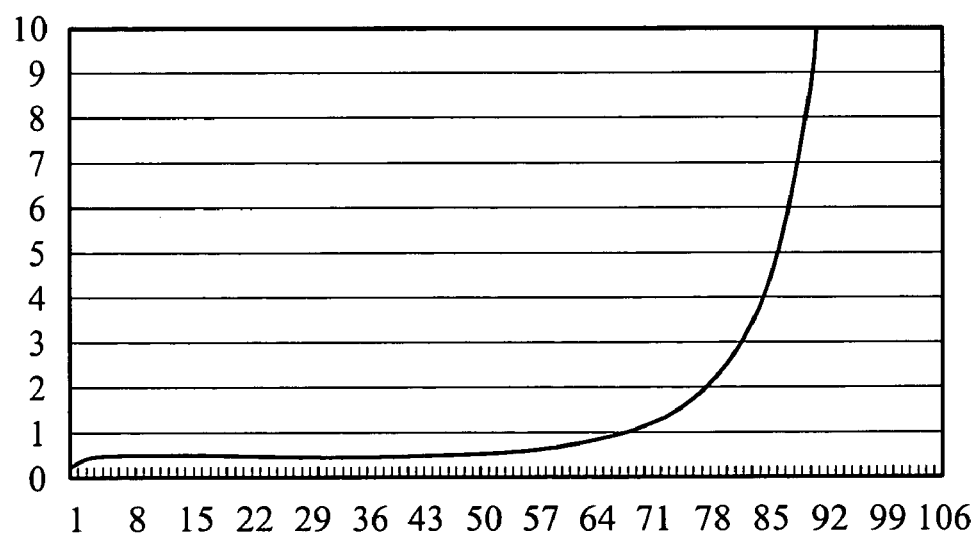

The box 11 is moved to a position outside the case, and the position is defined as a handling position. At the handling position, the loaded object 30 is put into the box 11. The first actuator 121 and the second actuator 122 form an acute angle, the second actuator 122 and the third actuator 123 form an obtuse angle, and the first actuator 121 forms an included angle with the moving direction Y. After the loaded object 30 is positioned on the handling position, a force is applied to the active component 124 such that it moves toward the case 20. The third actuator 123 then pushes the second actuator 122, and the second actuator 122 further pushes the first actuator 121 to move toward the interior of the case 20 (referring to FIG. 7A, the box 11 moves smoothly in the present situation). During the process of force application till the first actuator 121 and the second actuator 122 gradually form a right angle, as the first actuator 121 forms an included angle with the moving direction Y, the force applied on the first actuator 121 may generate a greatest component force to make the box 11 move slowly (referring to FIG. 7B, the box 11 moves slowly in the present situation). Under a continuous force application, the first actuator 121 gradually forms a linear relation with the moving direction Y, i.e., the generated component force is the smallest, so the box 11 moves in an accelerated rate (referring to FIG. 7C, the box 11 moves in an accelerated rate in the present situation), such that the active component 124 and the box 11 move asynchronously. However, when the first actuator 121 exceeds the moving direction Y to gradually form a linear relation with the second actuator 122, the pivot between the third actuator 123 and the second actuator 122 slightly remains the same to form a supporting point. At this time, the connector 31 of the loaded object 30 on the box 11 just presses against the connector 271 of the main board 27 (the first actuator 121 and the second actuator 122 have not formed a linear relation yet). Then, under a continuous force application, the active component 124 moves while the box 11 slightly stays still. When a force is applied to the active component 124 again, the distance between the pivot of the third actuator 123 and the second actuator 122 and the place where the first actuator 121 is connected to the pivot hole 1114 is the longest, so the applied force is amplified (referring to FIG. 7D, the force is amplified in the present situation). Further, the amplified force is used to insert the connector 31 of the loaded object 30 into the connector 271 of the main board 27, so as to achieve the electrical connection between the loaded object 30 and the main board 27. In addition, when the active component 124 is stopped by the stopper 1113, the first actuator 121 and the second actuator 122 are aligned linearly to form an interference relation. In the present situation, the box 11 is unable to be moved out of the case 20, and this situation is defined as the fixed position of the box 11.

On the contrary, when the box 11 is to be moved outside the case 20, the active component 124 is pulled to move outward. Similarly, the distance between the pivot of the third actuator 123 and the second actuator 122 and the place where the first actuator 121 is connected to the pivot hole 1114 is the longest, so the force is amplified for making the connector 31 of the loaded object 30 departed from the connector 271 of the main board 27. Besides, the pivot between the third actuator 123 and the second actuator 122 slightly remains still, and the active component 124 moves outward by a distance. Under a continuous force application, the first actuator 121 gradually forms a linear relation with the moving direction Y, i.e., the generated component force is the smallest. Therefore, the box 11 moves in an accelerated rate, such that the active component 124 and the box 11 move asynchronously. During the process of the force application till the first actuator 121 and the second actuator 122 gradually form a right angle, as the first actuator 121 forms an included angle with the moving direction Y, the force applied on the first actuator 121 generates the largest component force, and thus the box 11 slowly moves to the handling position.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A supporting frame structure disposed in a case, comprising:
    a box for mounting a loaded object, and movably disposed in the case by a linear relation along a moving direction; and
    a motion mechanism connected to the case and the box, the motion mechanism including:
        a first actuator with one end pivotally connected to the box;
        a second actuator with one end pivotally connected to the other end of the first actuator, and the other end pivotally connected to the case;
        a third actuator with one end pivotally connected to the second actuator near the pivot between the first actuator and the second actuator; and
        an active component, movably disposed in the box by a linear relation, with one end pivotally connected to the other end of the third actuator;
    wherein a force is applied to the motion mechanism to make the box have a handling position outside the case and a fixed position inside the case.

2. The supporting frame according to claim 1, wherein the case has a pair of slide rails mounted thereon, and the box is disposed across the slide rails to be moved linearly.

3. The supporting frame according to claim 1, wherein a guide rail is disposed below the box for limiting the linear movement of the active component.

4. The supporting frame according to claim 1, wherein at the handling position, the first actuator and the second actuator form an acute angle, the second actuator and the third actuator form an obtuse angle, and the first actuator forms an included angle with the moving direction.

5. The supporting frame according to claim 1, wherein at the fixed position, the first actuator and the second actuator are located on the same line to form an interference relation.

6. An electronic data processing device structure, comprising:
    a case with a pair of slide rails mounted thereon, wherein a supporting point is disposed at one side of the slide rails;

a box for mounting a loaded object, and movably disposed on the slide rails by a linear relation along a moving direction; and a motion mechanism, comprising:

a first actuator with one end pivotally connected to the box;

a second actuator with one end pivotally connected to the other end of the first actuator, and the other end pivotally connected to the supporting point;

a third actuator with one end pivotally connected to the second actuator near the pivot between the first actuator and the second actuator; and an active component, movably disposed in the box by a linear relation, with one end pivotally connected to the other end of the third actuator, wherein a force is applied to the active component to make the box have a handling position outside the case and a fixed position inside the case.

7. The electronic data processing device structure according to claim 6, wherein a guide rail is disposed below the box for limiting the linear movement of the active component.

8. The electronic data processing device structure according to claim 6, wherein at the handling position, the first actuator and the second actuator form an acute angle, the second actuator and the third actuator form an obtuse angle, and the first actuator forms an included angle with the moving direction.

9. The electronic data processing device structure according to claim 6, wherein at the fixed position, the first actuator and the second actuator are located on the same line to form an interference relation.

* * * * *